United States Patent Office 3,606,164
Patented Sept. 20, 1971

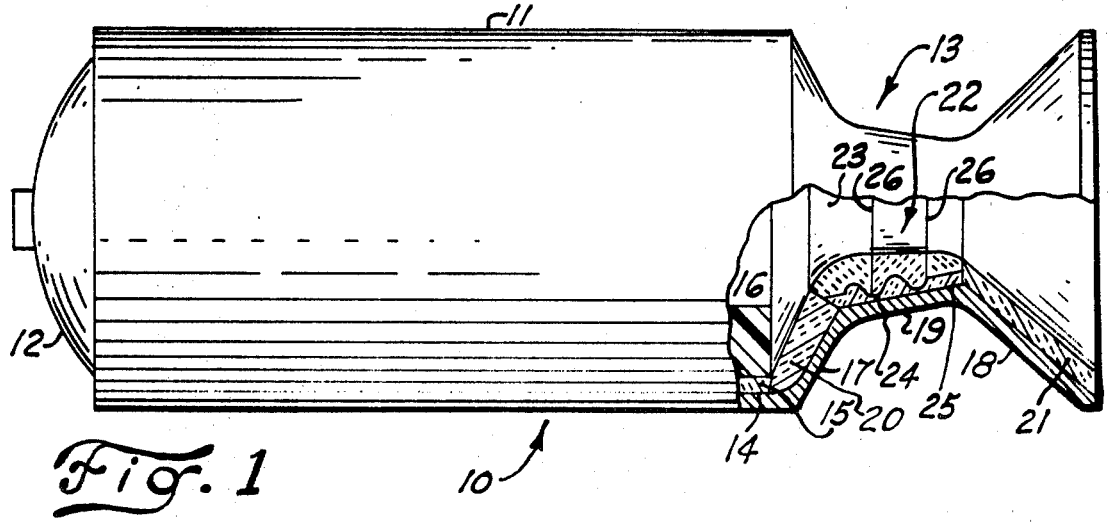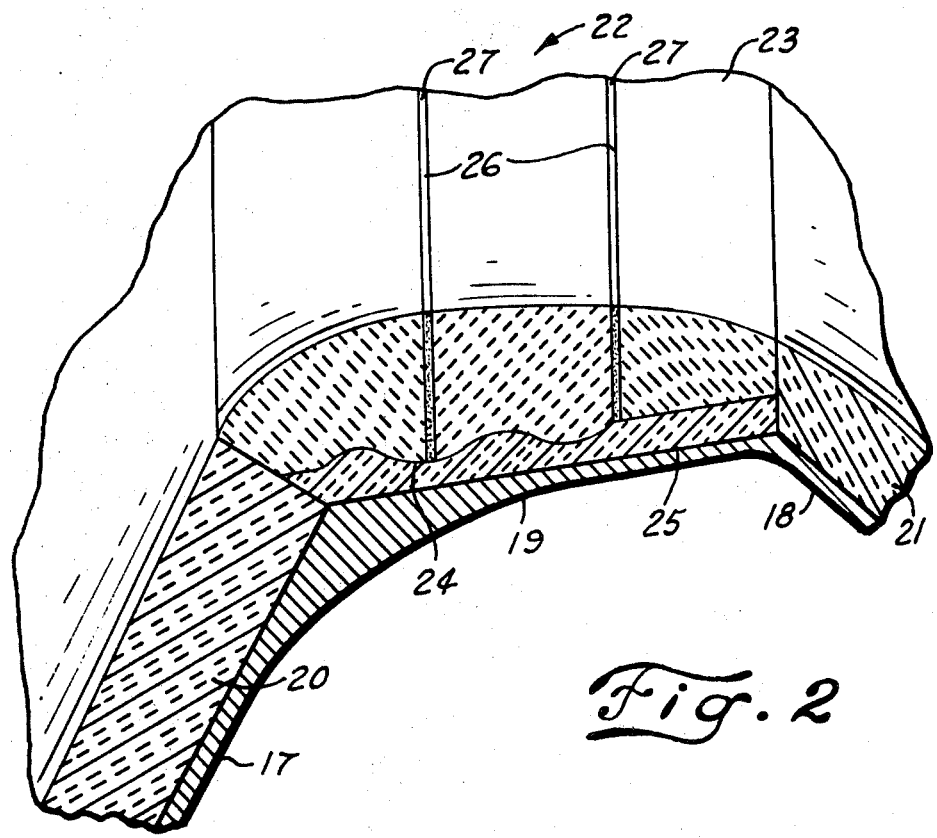
Fig. 1
Fig. 2
Cecil G. Stokes Jr.
Denny M. West
Kenneth E. Junior
James C. Machen
Walter E. Sharp
INVENTORS
BY [signature] ATTORNEY

3,606,164
NOZZLE THROAT INSERT ASSEMBLY
Cecil G. Stokes, Jr., Denny M. West, Kenneth E. Junior, James C. Machen, and Walter E. Sharp, Huntsville, Ala., assignors to Thiokol Chemical Corporation, Bristol, Pa.
Filed Oct. 23, 1969, Ser. No. 868,735
Int. Cl. B64d *33/04*
U.S. Cl. 239—265.15                           3 Claims

ABSTRACT OF THE DISCLOSURE

A throat insert assembly for the nozzle of a solid propellant rocket motor having incorporated therein a sine-wave configuration for preventing displacement of the throat insert from the nozzle during the tailoff of the solid propellant rocket motor.

BACKGROUND OF THE INVENTION

(1) Field of the invention

Operational requirements for a new and advanced solid propellant rocket motor necessitated a redesign of the conventional rocket motor case for the solid propellant rocket motor. The conventional diesign of the rocket motor case included a cylindrical throat area for the nozzle, but it was determined that if the new solid propellant rocket motor was to meet the new operational requirements that the throat area had to be conical instead of cylindrical.

One of the problems that arose from the conically shaped throat area was the displacement of the throat insert from the throat area during tailoff of the solid propellant rocket motor.

After several unsuccessful attempts to solve this problem, the throat insert assembly of the instant invention was finally designed and it has been determined that the invention is a complete and successful answer to the problem.

(2) Description of the prior art

In view of the change in shape of the nozzle throat area, the problem involving the displacement of the throat insert, had not been incountered in the past because the problem had not arisen when a cylindrical throat area had been used. Very little work in this field had been tried, therefore, prior to the new design for the advanced and improved rocket motor case.

SUMMARY OF THE INVENTION

This invention relates to improvements in throat insert assemblies that are utilized in the throat area of a nozzle for the rocket motor case of a solid propellant rocket motor and more particularly it relates to the specific configuration of the throat insert assemblies to prevent displacement thereof during tailoff of a solid propellant rocket motor.

Tailoff is a slang expression used in the rocket industry for the operational phase known as thrust dieaway, burnout, shutdown, thrust cutoff and thrust decay, which is the terminal phase of operation where the chamber pressure of the solid propellant rocket motor drops from its rated and steady level to zero or ambient pressure. The expression tailoff is also used as a definition for that portion of the plotted thrust-vs.-time curve (which is taken from measurements of the actual firing of the solid propellant rocket motor) where the curve drops steadily downward to burnout at the base line for the curve.

It is a well-known fact that high rates of pressure and temperature are developed by the combustion gases in the motor chamber of the rocket motor case of the solid propellant rocket motor during operation thereof. Since such combustion gases, creating the pressures and temperatures, exhaust through the nozzle for the rocket motor case, the throat area and the throat insert of the nozzle are greatly effected by the pressures and temperatures created by the combustion gases.

The conventional cylindrical throat area did not create undue problems as to displacement of the throat insert, but the use of a conically shaped throat area presented problems that had to be solved for the solid prepellant rocket motor using a conical shaped throat area to meet operational requirements.

Many attempts were made to solve this problem, some resulted in failure of the solid propellant rocket motor, others added additional damages such as destruction of the insert with subsequent damage to the rocket motor case and others cost too much to be considered.

Finally, however, a sine-wave configuration, as embodied by the instant invention, proved a solution to the problem and resulted in the instant invention.

It is an object of the present invention, therefore, to provide a nozzle throat insert assembly that includes therein a sine-wave configuration that prevents displacement of the nozzle throat insert assembly from the nozzle of a solid propellant rocket motor during tailoff thereof.

With the above and other objects and advantages in view as may appear to one skilled in the art from a reading of the following description wherein it will appear that the invention encompasses specific features of detail that are more fully illustrated in the accompanying drawing in which:

BRIEF DESCRIPTION OF THE DRAWING

FIG. 1 is an elevational view, partly broken away and partly in section, of a solid propellant rocket motor embodying the design of rocket motor case that is to be used with the nozzle throat insert assembly of the present invention; and FIG. 2 is an enlarged fragmentary sectional view more fully illustrating the configuration of the nozzle throat insert assembly.

DESCRIPTION OF THE PREFERRED EMBODIMENT

Referring more in detail to the drawing wherein like parts are designated by like reference numerals, the reference numeral 10 is used to generally designate a solid propellant rocket motor.

The solid propellant rocket motor 10 includes a rocket motor case 11 having a head end 12 and a nozzle 13 at the aft end thereof. The rocket motor case 11 creates a combustion chamber 14 therein that has an insulation liner 15 bonded to the interior surface thereof and a solid propellant grain 16 cast therein and bonded to the insulation liner 15.

The nozzle 13 is a convergent-divergent nozzle having a convergent portion 17 and a divergent portion 18 that are joined in integral assembly by a conical shaped throat portion 19.

The convergent portion 17 of the nozzle 13 has an insulation liner 20 bonded to the interior surface thereof and the divergent portion 18 has an insulation liner 21 bonded to the interior surface thereof and a nozzle throat assembly 22, embodying the invention, is bonded to the interior surface of the throat portion 19 with the outer edges thereof abutting the respective insulation liners 20 and 21.

The nozzle throat assembly 22 comprises an inner core 23 which is molded from a refractory material such as graphite in a truncated conical shape. The outer surface of the core 23 is then machined into a configuration 24 designated a sine-wave formation. A high temperature insulation 25, such as asbestos phenolic, is applied to the outer surface of the core 23 by wrapping or molding such material to the core and the outer surface of the insulation 25 is then machined so that it will conform to and contact the inner surface of the throat 19 and be bonded thereto. It will be noted that as the insulation 25 is applied to the outer surface of the core 23, that the inner surface thereof will conform to and assume a compatible sine-wave surface to follow in every detail the contuor of the outer surface of the core 23.

Circumferential stress relief slits 26 are then cut through the core 23 transversely thereof in relatively spaced relation to each other and gaskets 27 may be inserted into the slits 26 as shown in FIG. 2.

When the first solid propellant rocket motor 10, following the configuration shown in FIG. 1, was fired, it was found that during tailoff the throat insert would be displaced into the combustion chamber 14 of the rocket motor case 11 and because of its size, it would rattle around in the combustion chamber 14 and prevent the solid propellant rocket motor 10 from meeting its operational requirements.

The displacement of the insert being caused by the expansion and contraction of the conical throat 19, a fault that was not found in a cylindrical throat formation. The contraction of the conical throat 19, after it had been expanded by the passage therethrough of the hot combustion gases, would literally pop the insert into the combustion chamber 14 in the same manner as a watermelon seed would be popped from between the forefinger and thumb of a person's hand, when pressure was applied to the seed.

Many attempts were made to prevent displacement of the throat insert, but success was not achieved until a nozzle throat insert assembly, as defined herebefore, was used.

It was determined then that the sine-wave configuration, which expanded and contracted compatibly with the throat portion 19 and would not be displaced from the throat after the pressure of the combustion gases had ceased during tailoff of the solid propellant rocket motor 10, was the answer to the problem of displacement of the throat insert.

It is believed that from the foregoing description, the mode of construction and operation of the invention will be apparent to one skilled in the art and it is to be understood that variations in the mode of operation of the invention may be adhered to provided such variations fall within the spirit of the invention.

Having thus described the invention what is claimed as new and desired to be secured by Letters Patent is:

1. A nozzle throat insert assembly that is to be used with a rocket motor case for a solid propellant rocket motor having a convergent-divergent nozzle with a conical shaped throat portion, said assembly comprising a core of refractory material of substantially conical shape, a sine-wave configuration on the outer surface of said core and a layer of insulation applied to the outer surface of the core and molded thereto so that the outer surface of the core and the inner surface of the insulation are in contact with each other and have compatible sine-wave configurations therebetween.

2. A nozzle throat insert as in claim 1, wherein circumferential transverse stress relief slits are provided in said core in relatively spaced relation to each other.

3. A nozzle throat insert as in claim 2, wherein gaskets are positioned in said stress relief slits.

References Cited
UNITED STATES PATENTS

| | | | |
|---|---|---|---|
| 3,156,091 | 11/1964 | Kraus | 239—265.15 |
| 3,347,465 | 10/1967 | Shieber | 239—265.15X |
| 3,419,441 | 12/1968 | McAllister et al. | 239—265.15X |
| 3,441,217 | 4/1969 | McIntosh | 239—265.15 |
| 3,520,478 | 7/1970 | Shalen | 239—265.15 |

LLOYD L. KING, Primary Examiner